United States Patent
Masubuchi et al.

(10) Patent No.: US 7,857,227 B2
(45) Date of Patent: Dec. 28, 2010

(54) NON-CONTACT IC TAG, PACKAGE FOR MEMBER HAVING THE NON-CONTACT IC TAG, AND DEVICE USING THE MEMBER HAVING THE NON-CONTACT IC TAG

(75) Inventors: Yukio Masubuchi, Saitama (JP); Hiroyuki Yamauchi, Ebina (JP); Tomohiro Ono, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1290 days.

(21) Appl. No.: 11/404,786

(22) Filed: Apr. 17, 2006

(65) Prior Publication Data

US 2007/0063057 A1    Mar. 22, 2007

(30) Foreign Application Priority Data

Sep. 20, 2005    (JP) .............................. 2005-271796

(51) Int. Cl.
*G06K 19/06* (2006.01)

(52) U.S. Cl. ...................................... 235/492; 235/451

(58) Field of Classification Search ................. 235/492, 235/451; 340/572.7; 343/855, 857
See application file for complete search history.

(56) References Cited

U.S. PATENT DOCUMENTS

| | | | | |
|---|---|---|---|---|
| 7,044,388 B2 * | 5/2006 | Kamiya et al. | ............... | 235/492 |
| 7,098,794 B2 * | 8/2006 | Lindsay et al. | ........... | 340/572.3 |
| 7,327,261 B2 * | 2/2008 | Weslake et al. | .......... | 340/572.1 |
| 2004/0119593 A1 * | 6/2004 | Kuhns | .................... | 340/572.7 |
| 2006/0061475 A1 * | 3/2006 | Moskowitz et al. | ...... | 340/572.3 |

FOREIGN PATENT DOCUMENTS

| | | |
|---|---|---|
| JP | A-2003-533143 | 11/2003 |
| WO | WO 01/86967 A2 | 11/2001 |

* cited by examiner

*Primary Examiner*—Ahshik Kim
(74) *Attorney, Agent, or Firm*—Oliff & Berridge, PLC

(57) ABSTRACT

A non-contact IC tag includes; a plurality of antennas corresponding to a plurality of frequency bands, and a peel-off sticker. The peel-off sticker is applied to at least one of the plurality of antennas and can be peeled off to disable the at least one antenna to which the peel-off sticker is applied.

12 Claims, 5 Drawing Sheets

NON-CONTACT IC TAG, PACKAGE FOR MEMBER HAVING THE NON-CONTACT IC TAG, AND DEVICE USING THE MEMBER HAVING THE NON-CONTACT IC TAG

PRIORITY INFORMATION

This application claims priority to Japanese Patent Application No. 2005-271796, filed on Sep. 20, 2005, which is incorporated herein by reference in its entirety.

BACKGROUND

1. Technical Field

The present invention relates to a non-contact IC tag having multiple antennas corresponding to multiple frequencies, to a package for a member having the non-contact IC tag, and to a device using the member having the non-contact IC tag.

2. Related Art

A very small non-contact IC tag is currently being used for identification and the like of objects. The non-contact IC tag is available in various shapes, such as a label type, a card type, a coin type, and a stick type, and a desired type can be selected depending on the intended use. The non-contact IC tag has a size of approximately several millimeters to several centimeters and can communicate with an IC tag reader/writer through a radio wave or an electromagnetic wave.

Each of the non-contact IC tag and the reader/writer is provided with a resonant circuit which includes an antenna having an inductance component and a capacitor having a capacitance component. In a case where information is to be stored in the non-contact IC tag or where information stored in the non-contact IC tag is to be read from the IC tag, the antenna in the resonant circuit of the reader/writer is brought into close proximity with the antenna in the resonant circuit of the non-contact IC tag such that the antennas are electromagnetically connected in order to transfer the information, thereby performing writing or reading while the IC tag is being supplied with power by radio waves from the reader/writer by means of non-contact power transfer technology. Thus, the non-contact IC tag can be used semi-permanently without having a battery.

The frequency used for the non-contact IC tag is roughly divided into four frequencies bands: less than 135 kHz, 13.56 MHz, 2.45 GHz, and a UHF band. Generally, communication range becomes longer as the frequency becomes higher. When a frequency of 13.56 MHz is used, the communication range becomes up to 70 to 80 cm, and when a frequency of 2.45 GHz is used, the communication distance can be up to several meters. In addition, the non-contact IC tag has a characteristic of being susceptible to an influence of peripheral moisture or metal, depending on the used frequency band; therefore, it is necessary to select a non-contact IC tag having an optimum frequency band for its intended use.

Accordingly, the non-contact IC tag having multiple antennas conforming to the individual frequency bands is currently in use. For example, a frequency band which allows relatively long-range communication is required in physical distribution management, because multiple non-contact IC tags are accessed from a relatively long distance to collectively read information and to collectively write information conforming to a shipping destination into the non-contact IC tags at the time of shipping. Meanwhile, in a case where the non-contact IC tag is attached to a device which handles highly-confidential information, such as an image forming device; for example, a copy machine, it is necessary to use a frequency band capable of communicating over only a short distance, so that a radio wave does not leak peripherally, thereby enhancing security.

SUMMARY

According to n aspect of the present invention, there is provided a non-contact IC tag includes: a plurality of antennas corresponding to a plurality of frequency bands, a peel-off sticker being applied to at least one of the plurality of antennas, and the peel-off sticker can be peeled off to disable the at least one antenna to which the peel-off sticker is applied.

BRIEF DESCRIPTION OF THE DRAWINGS

Preferred embodiments of the present invention will be described in detail by reference to the following figures, wherein.

DESCRIPTION OF THE EMBODIMENTS

First Embodiment

Figure 1:
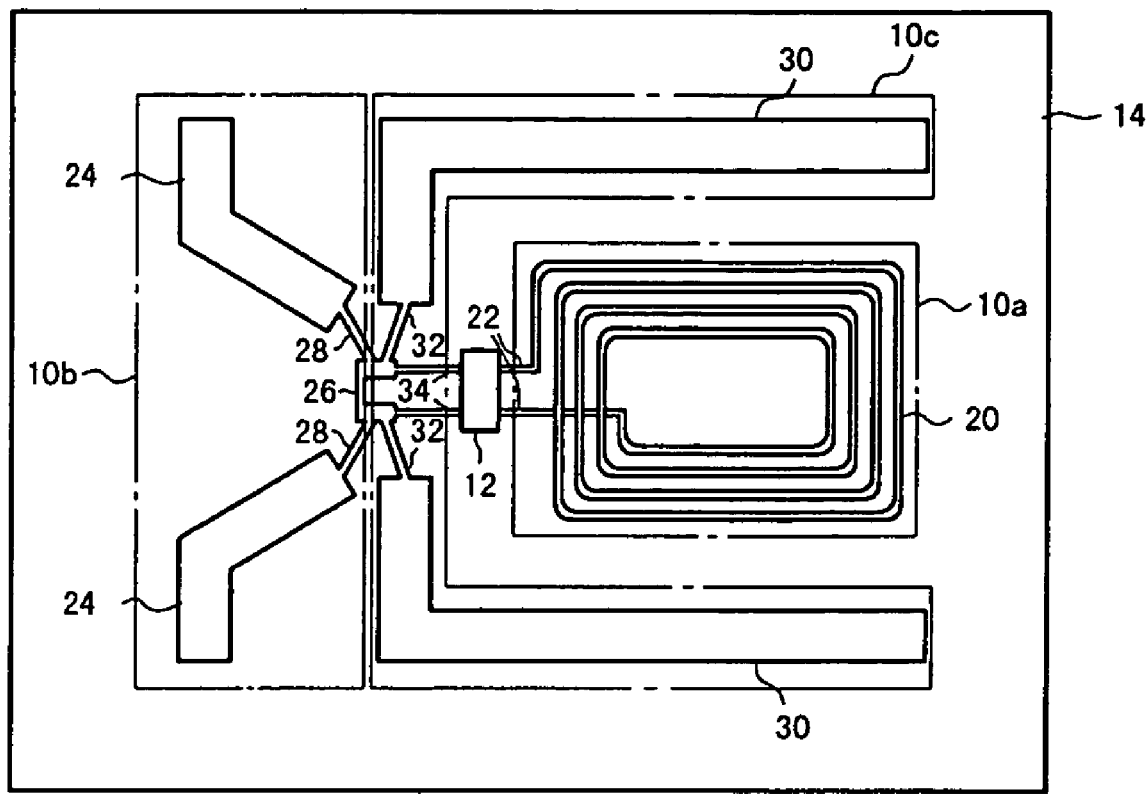
FIG. 1 is a diagram showing a structure of a non-contact IC tag according to a first embodiment.

As shown in a cutaway plan view of FIG. 1, a non-contact IC tag 100 according to a first embodiment of the invention is configured of multiple antennas 10a, 10b, 10c, a semiconductor chip 12, and a substrate 14. The antennas 10a to 10c and the semiconductor chip 12 are mounted on the surface of the substrate 14, which is formed of a dielectric substance such as polyimide, epoxy resin, or the like. The substrate 14 has a thickness of approximately several hundreds of micrometers to several millimeters.

The antennas 10a, 10b, 10c are component elements which serve as inductance components of the resonant circuit of the non-contact IC tag 100. In this embodiment, the antennas 10a, 10b, 10c are disposed to communicate in frequency bands of 13.56 MHz, 2.45, GHz and a UHF band, respectively. The antennas 10a to 10c are connected to a capacitor having a capacitance component formed within the semiconductor chip 12, to thereby configure the resonant circuit of the non-contact IC tag 100.

Each of the antennas 10a, 10b, 10c is formed of a thin metallic layer of copper or the like which is formed on the substrate 14. The metallic layer has a thickness of approximately several tens of micrometers to several hundreds of micrometers. For example, the antennas can be formed by etching the metallic layer covering the surface of the substrate 14 into a desired shape by means of a lithography technique or the like. Desirably, a portion where the metallic layers are stacked is formed into multilayer wiring with an insulating layer held there between.

The antenna 10a is formed by forming a thin metallic layer 20 into a coil. The antenna 10a is disposed near the center on the right-half side of the substrate 14 of FIG. 1 and connected to the semiconductor chip 12 via wiring portions 22 (here, "right" and "left" refer to the horizontal direction in FIG. 1).

The antenna 10b is disposed on the left side of the substrate in FIG. 1 and formed into a vertically symmetrical shape to expand in the vertical direction (here, "vertical" and "vertically" refer to the vertical direction in FIG. 1). The antenna 10b has wide end portions 24 and has a structure such that the end portions 24 and a center portion 26 are connected via connecting portions 28 having a width smaller than that of the end portions 24.

The antenna 10c is formed to have a vertically symmetrical shape and is located between the antenna 10a and the antenna 10b. The antenna 10c has wide end portions 30. The end portions 30 are formed to extend along the top and bottom of the antenna 10a. In addition, the antenna 10c has a structure such that the end portions 30 are connected with the center portion 26 via connecting portions 32 having a width smaller than that of the end portions 30.

The center portion 26, which connects the antennas 10b and 10c, is disposed on the side opposite the antenna 10a with the semiconductor chip 12 there between. The center portion 26 is connected to the semiconductor chip 12 via wiring portions 34.

Figure 2:
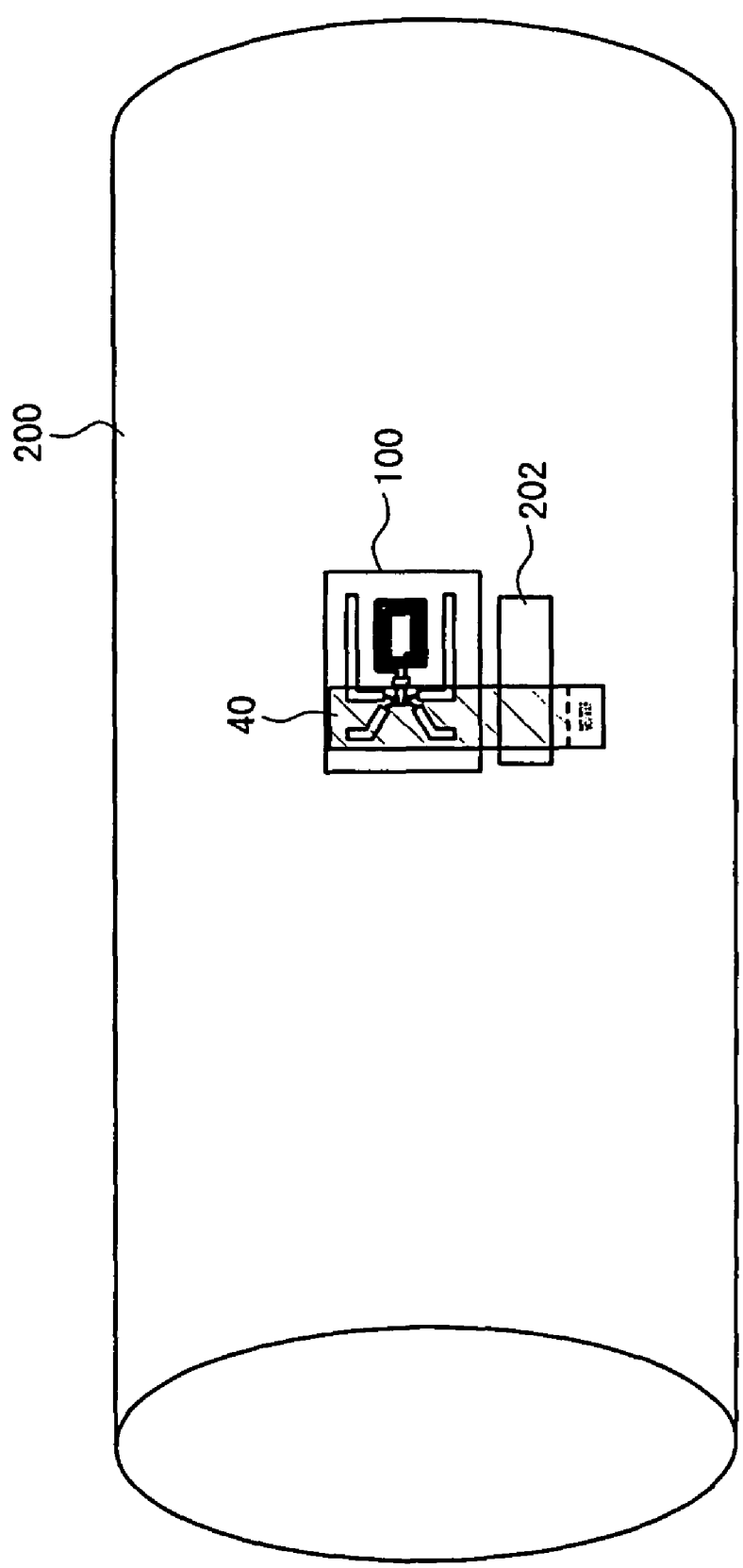
FIG. 2 is a diagram showing a member having the non-contact IC tag of the first embodiment.

The semiconductor chip 12 includes therein a semiconductor element which has a control circuit, a built-in memory circuit, and a capacitor-containing circuit formed on a semiconductor substrate. The semiconductor chip 12 is connected to the antennas 10a to 10c through the wiring portions 22, 34. When electromagnetically communicating with an external reader/writer (not shown), the semiconductor chip 12 writes and reads information into and from the built-in memory circuit. Specifically, the antenna in the resonant circuit of the reader/writer is brought into close proximity with any of the antennas 10a to 10c, which meets the used frequency of the reader/writer, at such a distance that the antennas are mutually connected electromagnetically, and information is transmitted to perform writing or reading while supplying power from the reader/writer to the non-contact IC tag 100 by a radio wave by means of a non-contact power transfer technique.

Where the non-contact IC tag 100 of this embodiment is used, it is attached to articles to be managed. For example, it is attached to a toner cartridge 200 as shown in FIG. 2, which in turn is put on to an image forming device, and is used for the physical distribution management of the toner cartridge 200 and for control at the time of forming an image. It should be noted that a proportion of the toner cartridge 200 to the non-contact IC tag 100 shown in FIG. 2 is exaggerated.

As described above, where the non-contact IC tag 100 is used for the physical distribution management, information must be read collectively by accessing, from a long distance, the non-contact IC tags 100 attached to multiple toner cartridges 200 which are packed in a cardboard box or the like, and information about shipping destinations must be collectively written into the non-contact IC tags at the time of shipping. Accordingly, the antennas 10b, 10c are used to access at a frequency band capable of attaining relatively long-range communication. Meanwhile, when the toner cartridge 200 is put onto the image forming device, it is desirable that only the antenna 10a is rendered usable, in order to prevent leakage of highly-confidential information or illegal access thereto, so that access can be made in only a frequency band that limits communication to only a short range.

Figure 3:
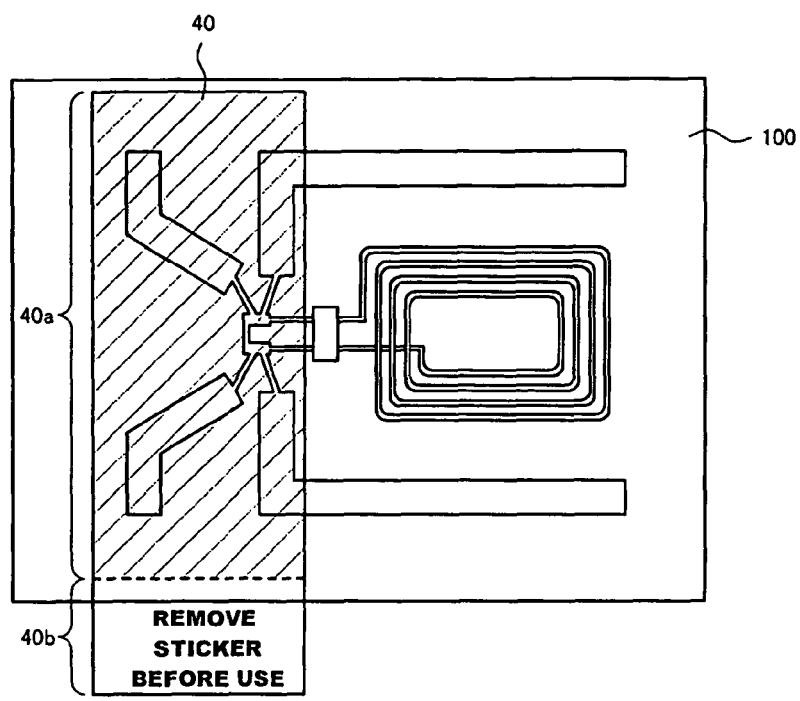
FIG. 3 is a diagram showing the non-contact IC tag of the first embodiment having a peel-off sticker.
Figure 4:
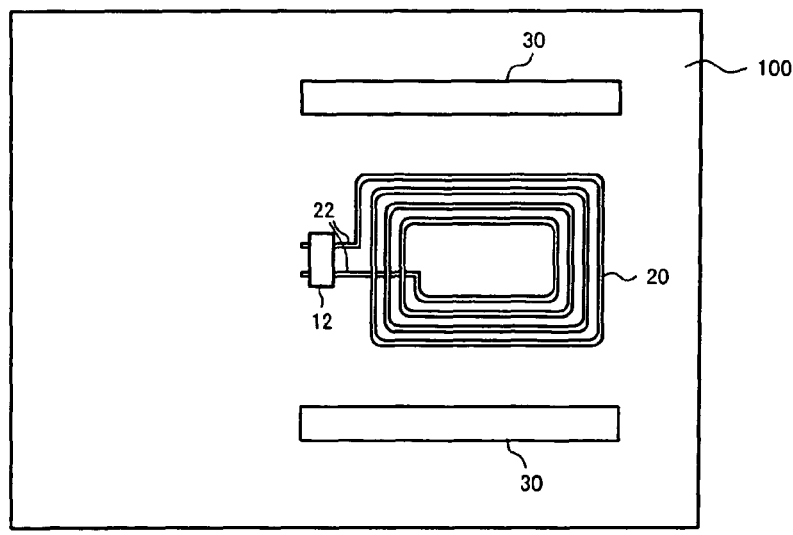
FIG. 4 is a diagram showing the non-contact IC tag, from which the peel-off sticker has been removed, of the first embodiment.

Therefore, in this embodiment, a peel-off sticker 40 is applied to cover at least a part of each of the antennas 10b, 10c of the non-contact IC tag 100, preferably a portion including the center portion 26 or the wiring portions 34 as shown in FIG. 3. In this case, at least one of the multiple antennas is disabled by means of removing the peel-off sticker 40 as shown in FIG. 4. Here, an adhesive force of the peel-off sticker 40 is adjusted so that the antennas 10b, 10c are cut off from the semiconductor chip 12. The multiple antennas include the antenna 10a, to which the peel-off sticker 40 is not applied, corresponding to a frequency band lower than those of the antennas 10b, 10c to which the peel-off sticker 40 is applied. In other words, among the multiple antennas, the antennas 10b, 10c to which the peel-off sticker 40 is applied are determined to be used for communication over a range longer than that attained by the antenna 10a to which the peel-off sticker 40 is not applied. Thus, when the peel-off sticker 40 is peeled off, long-range communication is disabled, and only short-range communication using the antenna 10a to which the peel-off sticker 40 is not applied is enabled.

Specifically, in a case where long-range communication is required for physical distribution management or the like, the non-contact IC tag 100 can be accessed by means of electromagnetic waves of 2.45 GHz and a UHF band without removing the peel-off sticker 40. Moreover, after the toner cartridge 200 is attached to the image forming device, the peel-off sticker 40 is peeled off to disable the antennas 10b, 10c when the toner cartridge 200 is to be put on to an image forming device, whereby the non-contact IC tag 100 can be accessed from only a short range by means of a 13.56-MHz band.

It is desirable that the peel-off sticker 40 be provided with a sticking part 40a and a non-sticking part 40b. The peel-off sticker 40 is applied to the non-contact IC tag 100 so as to cover at least part of each of the antennas 10b, 10c of the non-contact IC tag 100 with the sticking part 40a, preferably a portion including the center portion 26 or the wiring portions 34. To remove the peel-off sticker 40, a user holds and pulls the non-sticking part 40b, so that the antennas 10b, 10c of the non-contact IC tag 100 can be disabled easily.

It is also desirable that the non-sticking part 40b be partially fixed to a packing container for the toner cartridge 200. When the toner cartridge 200 is taken out of the packing container for attachment thereof, the peel-off sticker 40 is automatically removed from the non-contact IC tag 100, and the antennas 10b, 10c can also be removed from the non-contact IC tag 100. Thus, the antennas 10b, 10c for long-range communication can be assured of being peeled off.

A cartridge attachment section of the image forming device is preferably formed to have a structure such that the toner cartridge 200 cannot be put on unless the peel-off sticker 40 is removed from the non-contact IC tag 100. An image forming device (e.g., a printer, a copy machine, a multifunctional device or the like), to which the toner cartridge 200 having the non-contact IC tag 100 having the peel-off sticker 40 can be put on, is known to have a toner cartridge attachment section to which the toner cartridge 200 is put on and a structure such that the toner cartridge 200 cannot be put on to the toner cartridge attachment section unless the peel-off sticker 40 is peeled off. For example, it can be configured to have a groove in the toner cartridge 200, the cartridge attachment section is provided with a projection which fits into the groove, and the peel-off sticker 40 is applied to cover the groove of the toner cartridge 200. Thus, the toner cartridge 200 cannot be put on to the cartridge attachment section unless the peel-off sticker 40 is removed. Accordingly, if a user attempts to put on the toner cartridge 200 without removing the peel-off sticker 40, the toner cartridge 200 cannot be put on, so that the peel-off sticker 40 can be assured of being peeled off.

An image forming device (e.g., a printer, a copy machine, a multifunctional device or the like), to which the toner cartridge 200 having the non-contact IC tag 100 having the peel-off sticker 40 can be put on, desirably has a toner cartridge attachment section to which the toner cartridge 200 is put on and a structure such that the peel-off sticker 40 is automatically removed during attachment of the toner cartridge 200 to the toner cartridge attachment section. In other words, the toner cartridge attachment section of the image forming device is configured such that the peel-off sticker is automatically peeled off when a user puts on the toner cartridge 200 to the toner cartridge attachment section without removing the peel-off sticker, which is applied to a shutter of a toner supply port 202. Thus, even if the user fails to remove the peel-off sticker 40, the antennas 10b, 10c for long-range communication are automatically removed when the toner cartridge 200 is put on to the toner cartridge attachment section. Moreover, a member package is provided with a member having the non-contact IC tag 100, to which the peel-off sticker 40 is applied, and a packing member for housing the member, wherein the peel-off sticker 40 is fixed to a part of the packing member, and when the member is taken out of the packing member, the peel-off sticker 40 is automatically removed, whereby the antenna to which the peel-off sticker 40 is applied is disabled.

In a case where the non-contact IC tag 100 is attached to the toner cartridge 200, the non-contact IC tag 100 is desirably put on to the vicinity of the toner supply port 202 which is disposed in the toner cartridge 200 as shown in FIG. 2. Normally, the toner supply port 202 of the toner cartridge 200 is provided with a mechanical shutter, and the shutter is prevented from being opened or closed by the peel-off sticker until the toner cartridge 200 is put on to the toner cartridge attachment section of the image forming device. Therefore, the non-contact IC tag 100 is disposed near the toner supply port 202 to make the peel-off sticker 40 of the non-contact IC tag 100 also serve as the peel-off sticker which stops the mechanical shutter disposed at the toner supply port 202. Thus, where the toner cartridge 200 is used, unnecessary antennas should be removed from the non-contact IC tag 100 by removing the peel-off sticker 40 which is applied to the toner supply port 202.

It should be noted that the member provided with the non-contact IC tag having the peel-off sticker and the device using the member are not limited to the toner cartridge and the image forming device; the invention can be applied to any member which uses the non-contact IC tag to manage and control data and to any device using the member.

Second Embodiment

In the first embodiment, the user peels off the antennas which are used for long-range communication, before attaching the non-contact IC tag to the device, which uses only a short-range communicating function, such as an image forming device. In such a structure, if the user forgets to remove the antennas, there is a possibility of causing a problem that the device to which the non-contact IC tag is attached has trouble, or of illegal access to the non-contact IC tag being made from the outside of the device by means of the antennas left unremoved. According to a second embodiment, an antenna which is unnecessary when the non-contact IC tag is attached to a device can be disabled without use of a peel-off sticker.

Figure 5:
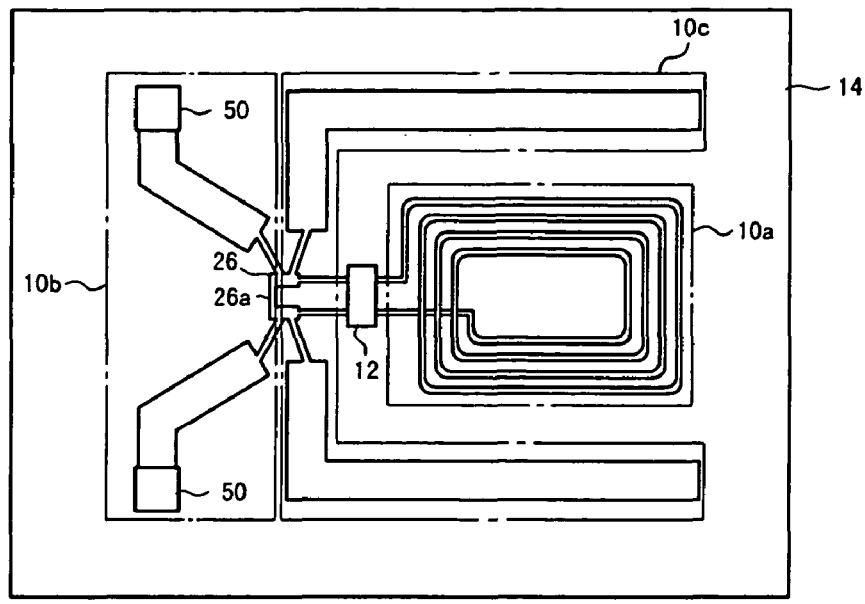
FIG. 5 is a diagram showing a structure of a non-contact IC tag according to a second embodiment.

As shown in FIG. 5, a non-contact IC tag 102 according to the second embodiment is provided with contact pads 50. The non-contact IC tag 102 includes the antenna 10a, which is not provided with the contact pads 50, corresponding to a frequency band lower than those of the antennas 10b, 10c which are provided with the contact pads 50. In other words, it is determined that among the multiple antennas, the antennas 10b, 10c provided with the contact pads 50 can be used to communicate over a range longer than that performed by the antenna 10a, which is not provided with the contact pads 50. For example, it is desirable that the antennas 10b, 10c provided with the contact pads 50 have fusing parts which have a shape thinner than other conductive portions. Thus, provision of the fusing parts which are thinner than the other conductive portions allows easy fusing of the antennas 10b, 10c by passing electric current from the contact pads 50. Specifically, both the end portions 24 of the antenna 10b are provided with the contact pads 50. Additionally, the center portion 26 which partially constitutes the antennas 10b, 10c is provided with a fusing portion 26a which is the thinnest portion of the antennas 10b, 10c. The non-contact IC tag 102 is attached to a predetermined position of the toner cartridge 200.

Figure 6:
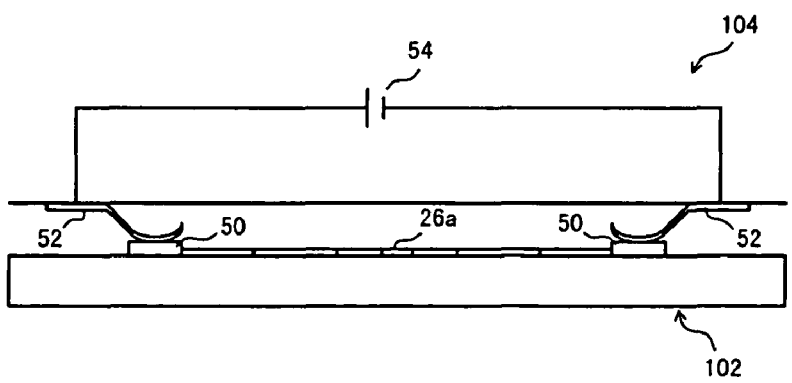
FIG. 6 is a diagram showing a current supply unit which supplies electric current to the non-contact IC tag according to the second embodiment.

Meanwhile, the toner cartridge attachment section of the image forming device is provided with a current supply unit 104 which fuses the fusing portion 26a of the non-contact IC tag 102. The current supply unit 104 is disposed such that leaf spring electrodes 52 come into contact with the contact pads 50 which are disposed on the non-contact IC tag 102 as shown in a conceptual diagram of FIG. 6 when the toner cartridge 200 having the non-contact IC tag 102 is put on to the toner cartridge attachment section. Moreover, the current supply unit is provided with a power source 54 which is connected to the leaf spring electrodes 52.

By configuring as described above, when the toner cartridge 200 is put on to the toner cartridge attachment portion, electric current passes from the contact pad 50 which is disposed on one of the end portions 24 of the antenna 10b to the contact pad 50 which is disposed on the other end portion 24 through the connecting portions 28 and the center portion 26. Here, the output of the power source 54 is determined such that the fusing portion 26a is fused by Joule heat which is generated by the electric current passing through the fusing portion 26a which is disposed at the center portion 26. Thus, the fusing portion 26a is fused, and the antennas 10b, 10c are cut off from the semiconductor chip 12.

Therefore, the antennas 10b, 10c for long-range communication required for the physical distribution management or the like can be reliably disabled by attaching the toner cartridge 200 to the image forming device, and only short-range communication by the antenna 10a in a 13.56 MHz band is enabled.

Figure 7:
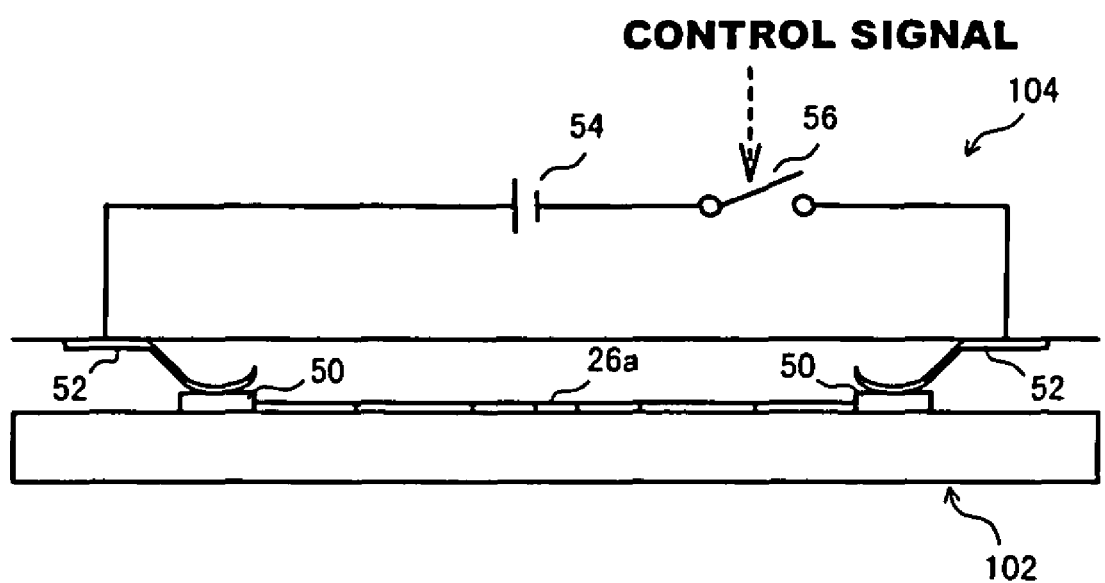
FIG. 7 is a diagram showing a current supply unit which supplies electric current to the non-contact IC tag according to the second embodiment.

As shown in the conceptual diagram of FIG. 7, there can also be adopted a configuration in which a control switch element 56 is disposed on the current supply unit, so that electric current is not immediately passed to the non-contact IC tag 102 when the toner cartridge 200 is put on, but electric current can be passed to the non-contact IC tag 102 as required by inputting a control signal to the control switch element 56.

For example, when access to the non-contact IC tag 102 of the toner cartridge 200 is performed by a procedure different from that of the ordinary access, a main control portion (not shown) of the image forming device judges that illegal access has been made and causes fusing of the antennas 10b, 10c for long-range communication by means of putting the control switch element 56 in a conduction state. For example, where the antennas 10*b*, 10*c* for long-range communication are used for communicating in a state where the toner cartridge 200 is put on, the control switch element 56 is put in a conduction state to fuse the antennas 10*b*, 10*c* for long-range communication.

Thus, the antennas for long-range communication are fused only when illegal access is detected, so that when there is no illegal access to the non-contact IC tag 102 at the time of attaching the toner cartridge 200, the antennas for long-range communication can be used again to access the non-contact IC tag 102 after the toner cartridge 200 is removed.

And, when access is performed for the first time by using the antenna 10*a* for short-range communication of the non-contact IC tag 102 after the toner cartridge 200 is attached, the main control portion of the image forming device may fuse the antennas 10*b*, 10*c* for long-range communication by putting the control switch element 56 in a conduction state. For example, where the toner cartridge 200 is put on to the image forming device on a trial basis, the antennas for long-range communication are not fused when the toner cartridge 200 is removed without performing the image forming processing, and the antennas for long-range communication can be used again to access the non-contact IC tag 102.

It is also desirable that the non-contact IC tags 100, 102 be provided with a long-range RF resonant circuit having a relatively high output, and a short-range RF resonant circuit having a low output for the antenna 10*a* for short-range communication. Thus, deterioration of access due to deviation of the resonance frequency or the like can be avoided by disposing multiple resonant circuits for the antenna 10*a* for short-range communication and selecting any one of the multiple resonant circuits depending on an access status from the image forming device.

According to the embodiments described above, illegal access can be prevented by suppressing communication with the non-contact IC tag provided with multiple antennas for multiple frequencies. In the embodiments, the toner cartridge provided with the non-contact IC tag and the image forming device using the same have been described as examples, but it should be noted that the invention is not limited to the above examples, and the technical idea of the present invention can be applied in any case where it is necessary to prevent illegal access to a member that performs control while managing data by means of the non-contact IC tag and a device using the member.

What is claimed is:

1. A non-contact IC tag, comprising:
   a plurality of antennas corresponding to a plurality of frequency bands,
   a peel-off sticker being applied to at least one of the plurality of antennas, wherein the peel-off sticker can be peeled off to disable the at least one antenna to which the peel-off sticker is applied, and
   a center portion forming a hub for one or more antennas, the center portion being removed by the removal of the peel-off sticker.

2. The non-contact IC tag according to claim 1, wherein the plurality of antennas include an antenna, to which the peel-off sticker is not applied, corresponding to a frequency band lower than that of the at least one antenna to which the peel-off sticker-is applied.

3. The non-contact IC tag according to claim 1, wherein the peel-off sticker has a sticking part and a non-sticking part.

4. A non-contact IC tag, comprising:
   a plurality of antennas corresponding to a plurality of frequency bands, at least one of the plurality of antennas being provided with a contact pad having an exposed contact surface which can be electrically contacted from the outside, wherein the at least one of the plurality of antennas provided with the contact pad has a fusing portion having a shape thinner than the other conductive portion.

5. The non-contact IC tag according to claim 4, wherein the plurality of antennas include an antenna which is not provided with a contact pad corresponding to a frequency band lower than that of the antenna which is provided with the contact pad.

6. A device provided with an attachment section allowing attachment of a member having a non-contact IC tag, which is provided with a plurality of antennas corresponding to a plurality of frequency bands, wherein a peel-off sticker is applied to at least one of the plurality of antennas, and the peel-off sticker can be peeled off to disable the at least one antenna to which the peel-off sticker is applied, wherein:
   the attachment section has a structure such that the member cannot be attached when the peel-off sticker has not been removed.

7. A device provided with an attachment section allowing attachment of a member having a non-contact IC tag, which is provided with a plurality of antennas corresponding to a plurality of frequency bands, wherein a peel-off sticker is applied to at least one of the plurality of antennas, and the peel-off sticker can be peeled off to disable the at least one antenna to which the peel-off sticker is applied, wherein:
   the attachment section has a structure such that the peel-off sticker is automatically removed when the member is attached.

8. A member package provided with:
   a member having a non-contact IC tag, which is provided with a plurality of antennas corresponding to a plurality of frequency bands, wherein a peel-off sticker is applied to at least one of the plurality of antennas, and the peel-off sticker can be peeled off to disable the at least one antenna to which the peel-off sticker is applied, and
   a packing member for housing the member, wherein:
   the peel-off sticker is fixed to a portion of the packing member, and the peel-off sticker is peeled off when the member is taken out of the packing member, thereby disabling the at least one antenna to which the peel-off sticker is applied.

9. A device which is provided with an attachment section allowing attachment of a member, which is provided with a non-contact IC tag provided with a plurality of antennas corresponding to a plurality of frequency bands, wherein at least one of the plurality of antennas is provided with a contact pad which can be electrically contacted from the outside, wherein:
   the attachment section is provided with a current supply device which can pass an electric current to an antenna, on which the contact pad is disposed, through the contact pad.

10. The device according to claim 9, wherein the attachment section is provided with a control switch element for controlling a supply of an electric current from the current supply device.

11. The device according to claim 10, wherein the current supply device can supply an electric current to the antenna which is provided with the contact pad, by turning on the control switch element when communication is performed by use of an antenna which is not provided with the contact pad disposed on the non-contact IC tag in a state in which the member is attached to the attachment section.

12. The device according to claim 10, wherein the current supply device supplies an electric current to the antenna which is provided with the contact pad, by means of turning on the control switch element under the assumption that illegal access has been made when communication is performed by using an antenna which is provided with the contact pad disposed on the non-contact IC tag in a state in which the member is attached to the attachment section.

* * * * *